Figure 1:
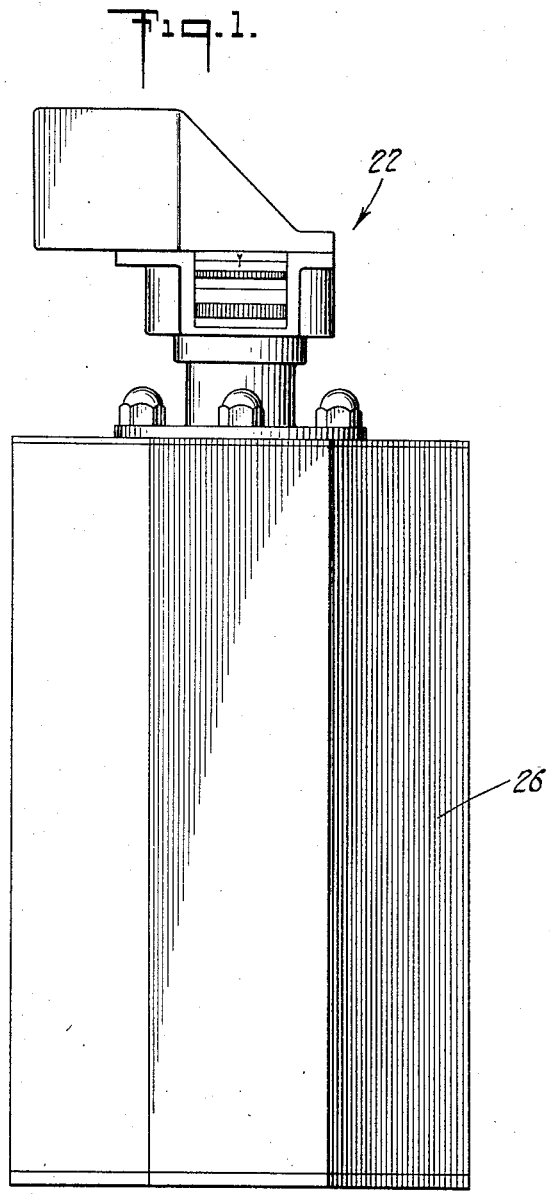

Feb. 22, 1944.  C. B. GATY  2,342,512
FILM MAGAZINE SHUTTER CONTROL
Original Filed May 24, 1941   3 Sheets-Sheet 1

INVENTOR.
CLINTON B. GATY.
BY
Blair, Curtis & Hayward
ATTORNEYS

Feb. 22, 1944. C. B. GATY 2,342,512
FILM MAGAZINE SHUTTER CONTROL
Original Filed May 24, 1941 3 Sheets-Sheet 3

INVENTOR
CLINTON B. GATY.
BY Blair, Curtis & Hayward
ATTORNEYS

Patented Feb. 22, 1944

2,342,512

UNITED STATES PATENT OFFICE 2,342,512

FILM MAGAZINE SHUTTER CONTROL

Clinton B. Gaty, Jamaica, N. Y., assignor to Fairchild Aviation Corporation, Jamaica, N. Y., a corporation of Delaware Original application May 24, 1941, Serial No. 395,098. Divided and this application January 14, 1942, Serial No. 426,680

5 Claims. (Cl. 88—17)

This invention relates generally to motion picture cameras and more particularly to apparatus for positioning a film magazine in the camera, and for controlling the magazine shutter.

This application is a division of the copending application of Clinton B. Gaty and George Rattray, Serial No. 395,098, filed May 24, 1941.

Modern motion picture cameras, particularly of the 8 millimeter and 16 millimeter type are quite often provided with film magazine compartments adapted to receive a unitary enclosed film magazine which can be placed in and taken out of the magazine compartment at will, regardless of the amount of film exposed. When such magazines are used, however, it is important that they be properly positioned within the magazine compartment so that the film is in proper registry with the camera lens during operation of the camera. It is also important for the film magazine to be held securely in proper position after being installed in the camera. Such film magazines also are usually provided with a slidable shutter which must be opened when the magazine is installed in the camera, and closed when the magazine is removed from the camera, so as to prevent undesired exposure of the film. It has been customary in many cameras to provide some sort of manual control on the outside of the camera for engaging a suitable abutment on the film magazine to operate the magazine shutter at the desired times. This type of magazine shutter operation has proved impractical as it was found that when the shutter operating lever or button on the camera was out of position prior to insertion of the magazine, there was a tendency for the magazine to jam or for the shutter control thereon to register imperfectly with the manual control, with the result that either the magazine shutter was not opened at all, or was only partly opened.

It is among the objects of this invention to provide a film magazine positioning and holding construction, and an automatic magazine shutter control characterized by simplicity and sturdiness and capable of overcoming the difficulties mentioned above in a simple and practical manner. Other objects will be in part apparent and in part pointed out hereinafter.

The invention accordingly consists in the features of construction, combinations of elements, and arrangements of parts as will be exemplified in the structure to be hereinafter described and the scope of the application of which will be indicated in the following claims.

Figure 2:
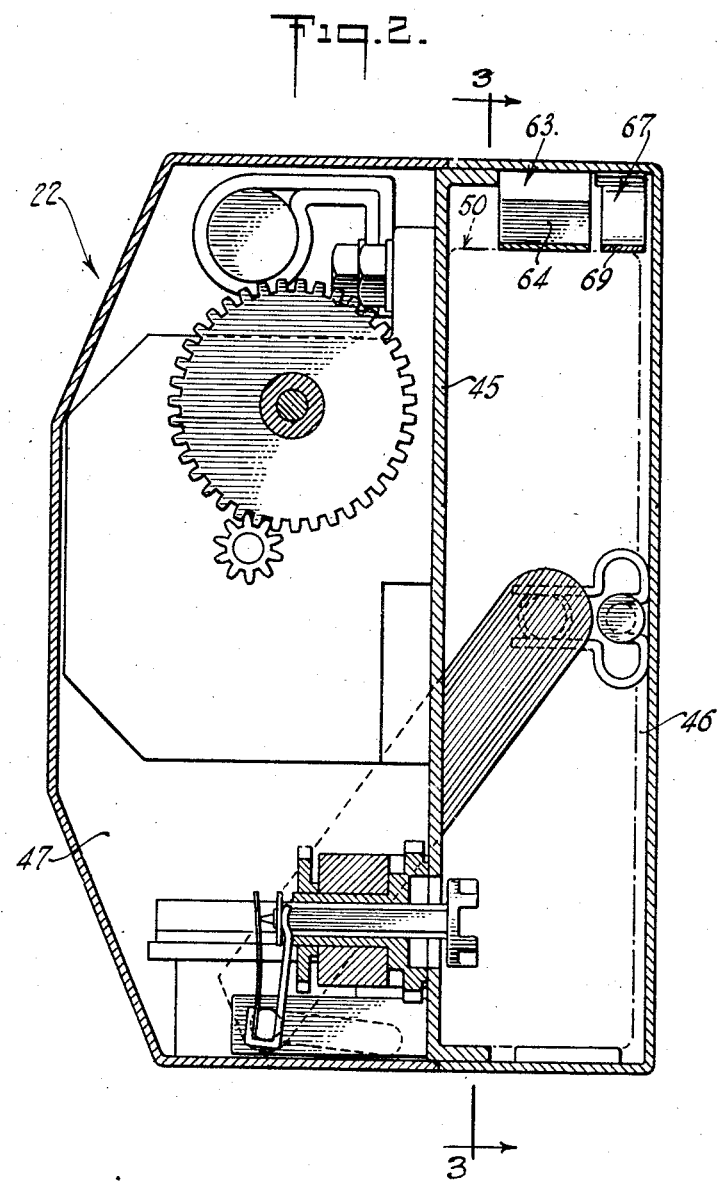
Figure 3:
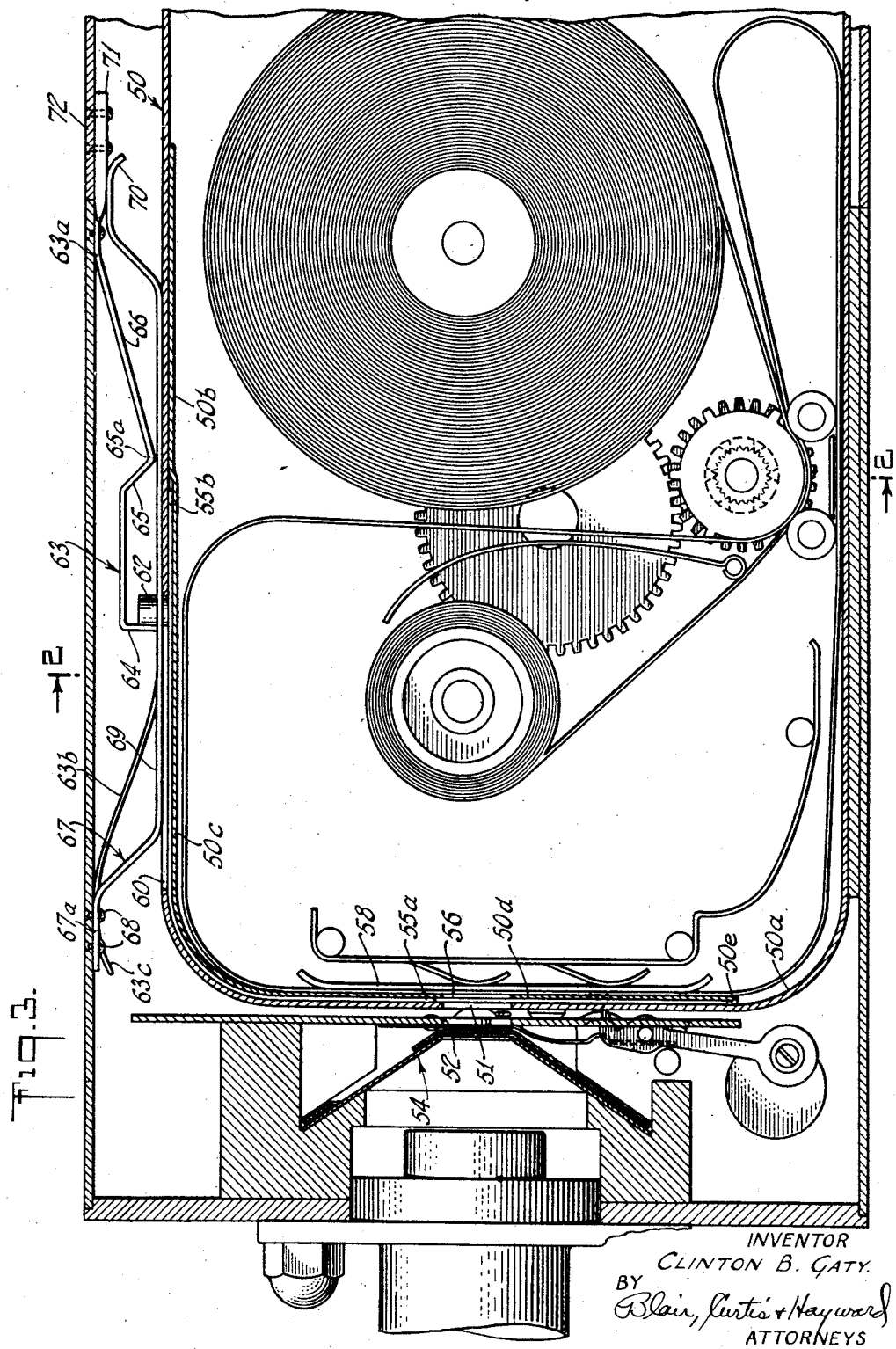

In the drawings, in which is shown one of the various possible embodiments of the invention, Figure 1 is an elevation of a camera of the type under consideration;

Figure 2 is an enlarged staggered section taken along the line 2—2 of Figure 3; and Figure 3 is a fragmentary section taken along the line 3—3 of Figure 2.

Similar reference characters refer to similar parts throughout the various views of the drawings.

Referring first to Figure 1, a camera generally indicated at 22 includes a casing 26 which houses the film magazine, shutter operating mechanism, film feeding mechanism and drive therefor, all as particularly described in the above-noted copending application. Only the structure associated with the film magazine will be gone into herein.

As is better shown in Figure 2, camera 22 includes a casing 26 which has extending longitudinally therethrough a partition 45 which divides the casing into a film magazine compartment 46 and an operating mechanism compartment 47. These compartments are permanently closed at one end and are provided at the other end with a suitable closure or door 72 (Figure 3) which is hinged to the bottom of casing 26. Compartment 46 is dimensioned to receive a commercial film magazine generally indicated at 50 (Figure 3) such as, for example, that shown in United States patent to O. Wittle 2,043,914. This film magazine has an opening 51 which when the magazine is properly positioned within its compartment 46 registers with an opening 52 in a partition 53 adjacent the camera shutter generally indicated at 54. Also, film magazine opening 51 is, when the magazine is correctly positioned within the camera, in alignment with the optical axis of the camera lens system so that upon operation of the camera the full recording area of the film is used.

Film magazine opening 51 is formed in the outer casing 50a (Figure 3) of film magazine 50, and this opening is closed by an elongated slide or shutter 55 (i. e., closed when the magazine is out of the camera) which extends from a point 55a adjacent the upper edge of opening 51 in magazine casing 50a to a point 55b on the upper side of the magazine casing. Shutter 55 is, of course, located within the magazine and is held against magazine casing 50a by a strip 50b secured to the upper side of magazine casing 50a and extending in spaced relation thereto as at 50c and 50d along a portion of the upper and left-hand sides of casing 50a as viewed in Figure 3. The lower end of strip 50b may be secured in any suitable manner as at 50c to the left-hand side of the magazine casing. Thus, strip 50b forms with casing side 50a a space in which flexible shutter 55 may slide. When magazine 50 is installed within the camera, slide 55 is in the position shown in Figure 3. When, however, the magazine is withdrawn from its compartment in the camera, slide 55 is so moved, as will be described hereinbelow, that its end 55a is moved between magazine casing 50a and strip 50b so as to lie between opening 51 in the casing and a registering opening 56 in strip 50b, to prevent undesired exposure of the film.

Thus when the magazine 50 is in the camera and as the film 57 is fed from the supply spool to the rewind spool, it passes between slide 55 and a presser plate 58 and across opening 56 to receive light directed therethrough.

Still referring to Figure 3, magazine casing 50a has a slot 60 cut in the upper side thereof adjacent the left-hand end thereof, as viewed in this figure. Through this slot extends a pin 62, the inner end of which is attached in any suitable manner to shutter 55. When pin 62 abuts or lies near the rear edge of slot 60, openings 51 and 56 in the magazine casing 50a and strip 50b are open as the lower end 55a of slide 55 lies above the upper edges of these openings. When pin 62 abuts or lies adjacent the forward or left-hand edge of slot 60, openings 51 and 56 are closed, as the lower edge of the shutter lies below the lower edges of the openings, as viewed in Figure 3.

A leaf spring which is generally indicated at 63 in Figure 3 has one end 63a thereof secured in any suitable manner to the side of camera casing 26. Midway of the ends of spring 63 are a pair of abutments 64 and 65, the former of which is preferably parallel with pin 62, and the latter of which is inclined with respect thereto. Between spring end 63a and the bottom 65a of abutment 65 is an inclined portion 66 against which the top of pin 62 rides when magazine 50 is inserted in compartment 46. As the pin passes along inclined portion 66 of the spring, the spring is forced upwardly so that pin 62 may ride under bottom point 65a of spring abutment 65. After the pin has passed this point, spring 63 snaps back into the position shown in Figure 3, wherein the pin and spring abutment 64 engage as the magazine is forced farther into the camera. As soon as these two parts, i. e., the pin and abutment 64 engage and upon continued movement of the magazine into its compartment, pin 62 is slid along slot 60 until it engages the rear extremity of the slot. Slot 60 is so dimensioned that when pin 62 engages the right-hand end thereof, as viewed in Figure 3, magazine 50 is properly positioned with respect to partition 53. Furthermore, movement of the pin 62 along slot 60 toward the right-hand end of the slot causes the lower end 55a of shutter 55 to be drawn upwardly to the position shown in Figure 3 to uncover openings 51 and 56.

As shown in Figures 2 and 3, an elongated relatively stiff spring 67 has one end 67a thereof riveted or otherwise secured to camera casing 26 as at 68 (Figure 3) and includes an elongated portion 69 adapted to bear against the upper side of magazine 50, as shown in this figure. By reason of the stiffness of spring 67, it holds magazine 50 securely in its proper operative position against any displacing tendency to which the camera might be subjected. The free end of spring 67 is provided with a lip 70 under which a cam 71 riveted to the camera door 72 is adapted to enter when the door is closed. This action of the cam increases the stiffness of spring 69 thus forcing spring portion 69 more firmly against the side of magazine 50.

Spring 63 also includes another inclined portion 63b which extends upwardly from the bottom of abutment 64, and has a free end 63c which bears against camera casing 26. As shown in Figure 2, the lower end of portion 63b of spring 63 rests against the top of film magazine 50, and thus coacts with portion 69 of spring 67 in forcing and holding the magazine into its proper operative position.

It may now be seen that spring 63 (Figure 3) has a double function, i. e., that of opening the film magazine shutter when the magazine is pressed into position and that of coacting with pressure spring 67 in holding the film magazine in proper operative position. Furthermore by reason of the parallel relationship between abutment 64 of spring 63 and pin 62, a positive engagement is effected between these parts upon insertion of the magazine into the camera so as to insure the shutter being withdrawn from its closing position. The inclination of spring abutment 65 from the horizontal is greater than that of spring portion 66, so that abutment 65 first causes shutter 55 to close, by reason of the engagement of pin 62 with abutment 65, and after the shutter has been closed, pin 62 can ride under abutment 65, pressing the spring upwardly to release the magazine for complete withdrawal from the camera. By reason of the lesser inclination of spring portion 66 of spring 63, there is but slight tendency of this portion of the spring to move pin 62 along slot 60 when the magazine 50 is inserted in the camera, i. e., the vertical component of force so substantially exceeds the horizontal component that spring 63 is forced upwardly rather than pin 62 being slid along slot 60.

Accordingly I have provided a film magazine positioning and film shutter operating device which fulfills the several objects set forth hereinabove in a thoroughly practical and efficient manner.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In motion picture camera construction, in combination, a casing having a chamber formed therein adapted to slidably receive a film magazine, a film magazine adapted to be inserted in or withdrawn from said chamber, said film magazine having an aperture formed therein, a shutter on said magazine movable between open and closed positions with respect to said aperture, a projection on said shutter extending through a slot in said magazine and reciprocable to operate said shutter, a resilient member in said chamber engageable with said shutter operating projection upon insertion of said magazine in said casing to move said shutter to its open position, said resilient member also including a portion adapted to engage said magazine and resiliently hold it in proper operative position when installed in said chamber, a second resilient member within said chamber operatively associated with said first resilient member for engaging said magazine when installed in said chamber so as to coact with said first resilient member to retain said magazine in proper operative position, a closure hingedly mounted on said casing adjacent said second member, and means on said closure for engaging said second resilient member when said closure is in its chamber closing position to force said second resilient member against said magazine.

2. In motion picture camera construction, in combination, a casing having a chamber formed therein adapted to slidably receive a film magazine, a film magazine adapted to be inserted in or withdrawn from said chamber, said film magazine having an aperture formed therein, a shutter on said magazine movable between open and closed positions with respect to said aperture, a projection on said shutter extending through a slot in said magazine and reciprocable to operate said shutter, and a resilient member in said chamber having an abutment formed thereon engageable with said shutter operating projection upon insertion of said magazine in said casing to move said shutter to open position, said resilient member also including a second abutment adapted to engage said shutter projection upon withdrawal of said magazine from said casing to move said shutter to its closed position, said first-mentioned abutment being substantially parallel to said projection and said second abutment being inclined with respect to said projection, whereby upon engagement between said projection and said second abutment said shutter is first moved to its closed position and thereafter said projection underrides said second abutment to permit withdrawal of said magazine from said chamber.

3. In motion picture camera construction, in combination, a casing having a chamber formed therein adapted to slidably receive a film magazine, a film magazine adapted to be inserted in or withdrawn from said chamber, said film magazine having an aperture formed therein, a shutter on said magazine movable between open and closed positions with respect to said aperture, a projection on said shutter extending through a slot in said magazine and reciprocable to operate said shutter, and a resilient member in said chamber having an abutment formed thereon engageable with said shutter operating projection upon insertion of said magazine in said casing to move said shutter to open position, said resilient member also including a second abutment adapted to engage said shutter projection upon withdrawal of said magazine from said casing to move said shutter to its closed position, said first-mentioned abutment being substantially parallel to said projection and said second-mentioned abutment being inclined with respect to said projection, whereby upon engagement between said projection and said second abutment said shutter is first moved to its closed position and thereafter said projection underrides said second abutment to permit withdrawal of said magazine from said chamber, said resilient member also including a portion adapted to engage a side of said magazine when said magazine is inserted in said chamber to hold said magazine in proper operative position therein.

4. In motion picture camera construction, in combination, a casing having a chamber formed therein adapted to slidably receive a film magazine, a film magazine adapted to be inserted in or withdrawn from said chamber, said film magazine having an aperture formed therein, a shutter on said magazine movable between open and closed positions with respect to said aperture, a projection on said shutter extending through a slot in said magazine and reciprocable to operate said shutter, and a resilient member in said chamber having an abutment formed thereon engageable with said shutter operating projection upon insertion of said magazine in said casing to move said shutter to open position, said resilient member also including a second abutment adapted to engage said shutter projection upon withdrawal of said magazine from said casing to move said shutter to its closed position, said first-mentioned abutment being substantially parallel to said projection and said second abutment being inclined with respect to said projection whereby upon engagement between said projection and said second-mentioned abutment said shutter is first moved to its closed position and thereafter said projection underrides said second abutment to permit withdrawal of said magazine from said chamber, said resilient member also including an inclined portion under which said projection rides to force said resilient member away from said magazine upon insertion of the magazine into said chamber, the inclination of said inclined portion being less than the inclination of said second abutment to preclude movement of said projection along said slot as said projection underrides said inclined portion.

5. In motion picture camera construction, in combination, a casing having a chamber formed therein adapted to slidably receive a film magazine adapted to be inserted in or withdrawn from said chamber, a door for said chamber, a shutter on said magazine movable between open and closed positions with respect to the aperture in said film magazine, said shutter having an operating projection formed thereon, resilient means in said camera for engaging said projection to open said shutter upon insertion of said magazine and to close said shutter upon withdrawal of said magazine, spring means in said camera adapted to engage the magazine for holding said magazine in proper operative position when said door is open, and means associated with said door and operated thereby for increasing the tension of said spring means when said door is closed.

CLINTON B. GATY.